United States Patent [19]

Nosaki et al.

[11] Patent Number: 5,107,344
[45] Date of Patent: Apr. 21, 1992

[54] IMAGE FORMING APPARATUS HAVING A SCANNER

[75] Inventors: Takefumi Nosaki; Kazuo Sasama, both of Kanagawa, Japan

[73] Assignee: Kabushiki Kaisha Toshiba, Kawasaki, Japan

[21] Appl. No.: 467,536

[22] Filed: Jan. 19, 1990

[30] Foreign Application Priority Data

Jan. 27, 1989 [JP] Japan .................................. 1-16214

[51] Int. Cl.⁵ .............................................. H04N 1/04
[52] U.S. Cl. .................................. 358/401; 358/409; 358/411; 358/497
[58] Field of Search ............... 358/400, 401, 408, 409, 358/410, 411, 474, 486, 488, 491, 494, 497, 451

[56] References Cited

U.S. PATENT DOCUMENTS

| 4,635,129 | 1/1987 | Miyagi | 358/474 |
| 4,667,246 | 5/1987 | Ashinuma | 358/409 |
| 4,691,237 | 9/1987 | Shimizu | 358/409 |
| 4,779,141 | 10/1988 | Watanabe | 358/401 |
| 4,791,492 | 12/1988 | Nagashima et al. | 358/409 |

FOREIGN PATENT DOCUMENTS 61-191168 8/1986 Japan .

Primary Examiner—Jin F. Ng
Assistant Examiner—Jerome Grant, II
Attorney, Agent, or Firm—Foley & Lardner

[57] ABSTRACT

An image forming apparatus includes an original document table for supporting an original document, an optical scanning device for scanning the original document supported by the original document table to capture an image of the original document and converting the captured image to an image data, an image forming unit for forming images on an image bearing medium according to the image data obtained by the optical scanning device, and a transmitter for transmitting a timing signal from the optical scanning device to the image forming unit. The timing signal represents a period of time required from the commencement of operation of the optical scanning device to the commencement of outputting the image data from the optical scanning device. The apparatus further includes a controller for controlling the formation of the images by synchronizing the operation of the image forming unit with the operation of the optical scanning device in response to the timing signal transmitted by the transmitter.

27 Claims, 10 Drawing Sheets

WRITE ADDRESS — 0, 1, 2, 3, ..., m, m+1

WRITE PULSE

Fig. 6A

READ-OUT ADDRESS FOR EQUAL MAGNIFICATION — 0, 1, 2, 3, ..., m, m+1

Fig. 6B

READ-OUT ADDRESS FOR MIRROR IMAGE CONVERSION — N, N+1, ..., m+1, m, m−1, ..., 3, 2

Fig. 6C

IMAGE FORMING APPARATUS HAVING A SCANNER

BACKGROUND OF THE INVENTION

1. Field of the Invention

The present invention relates to an image forming apparatus which is used as a digital photocopier composed, for example, by connecting a laser beam printer and a scanner.

2. Description of the Related Art

In recent years, digital photocopiers (image forming apparatuses) have been in practical use which connect laser beam printers (image forming units), which form images by electronic photography methods, with image scanners (reader units), which read image information from original documents as image data by the movement of an optical carriage (scanning device). In this type of copier, that the forming of an image is only executed at the time of operation of the optical carriage in the scanning device in the forward direction. The reason for this was that, because synchronization with the laser beam printer was difficult, in the case of also trying to execute the forming of an image during the backward operation of the optical carriage, the sequence of reading the image data in the image sensor positioned in the optical carriage must be reversed, and also the positional control of the secondary scanning direction of the optical carriage must be accurately carried out. However, basically, laser beam printers themselves are designed to be able to perform image forming at high speeds (high-speed printing operation) provided image data is fed to them rapidly and continuously. At the same time, in scanners, there is the backward operation of the optical carriage which does not contribute to image forming. For this reason, it was not possible to increase the image forming speed in the printers above that which was required.

Since, as described above, in the conventional image forming apparatus, there was the backward operation of the optical carriage which did not contribute to image forming in the scanner, there was the disadvantage that the image forming speed in the printer could not be increased above that which was required.

SUMMARY OF THE INVENTION

It is an object of the present invention to provide an image forming apparatus having a scanner which can control the image forming operation in the shortest synchronized time at such times, thereby shortening of the operating time for the image forming operation can be achieved.

According to the present invention, an image forming apparatus comprises means for supporting an original document; means for scanning the original document supported by the supporting means to capture an image of the original document and converting the captured image to an image data; means for forming images on an image bearing medium according to the image data obtained by the scanning means; means for transmitting a timing signal representing a period of time required from the commencement of operation of the scanning means to the commencement of outputting the image data from the scanning means to the image forming means; and means for synchronizing the operation of the image forming means with the operation of the scanning means in response to the timing signal transmitted by the transmitting means.

BRIEF DESCRIPTION OF THE DRAWINGS

FIGS. 6A to 6C are diagram showing an examples of a write address and a read-out address;

DETAILED DESCRIPTION OF THE PREFERRED EMBODIMENT

Referring to the accompanying drawings, a detailed description will subsequently be given of the preferred embodiment of the present invention.

Figure 1:
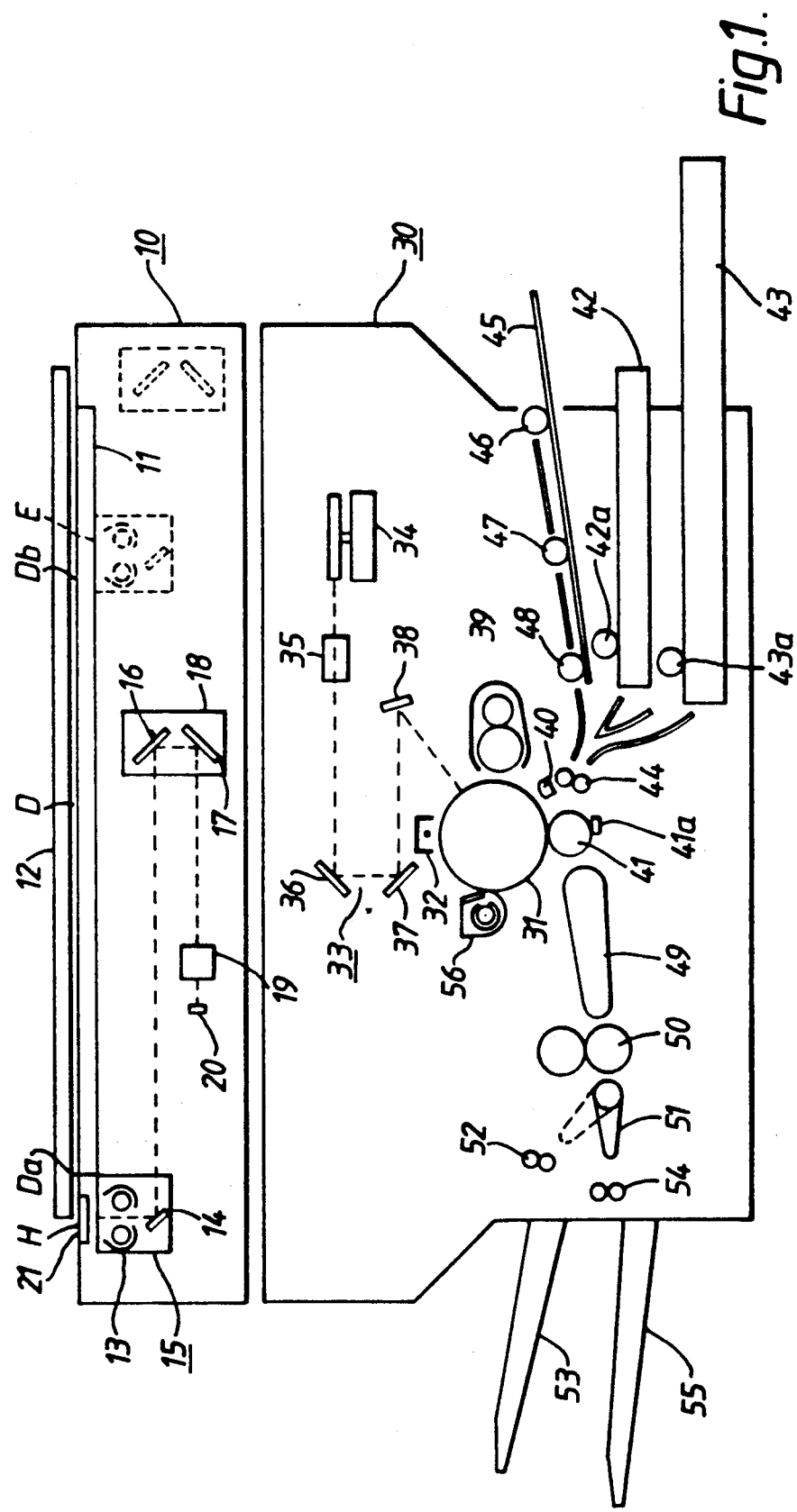
FIG. 1 is a schematic diagram showing a digital type copier as an image forming apparatus according to the present invention.

FIG. 1 shows a digital photocopier as an example of an image forming apparatus according to the present invention, comprising, for instance, electronic photography type laser beam printer (an image forming unit) 30 and image scanner (reader unit) 10. In this photocopier, laser beam printer 30 and image scanner 10 are electrically connected via an interface cable or the like, and laser beam printer 30 executes the forming of image (printing) in response to image date (image information) transmitted from image scanner 10.

Image scanner 10 comprises original document table (transparent glass) 11 on which original document D is placed; document cover 12 provided to open and close freely facing original document table 11; optical carriage (scanner unit) 15 facing these, in which are provided illuminating lamp 13 as the original document illuminating unit and first mirror 14 which receives the light reflected from original document D; sub-carriage 18 in which are mounted second and third mirrors 16 and 17 which alter the direction of the light from optical carriage 15 by 180 degrees; lens 19 which converges the reflected light from original document D passing through sub-carriage 18; image sensor 20 which reads image data by photoelectric conversion of the light converged by lens 19 and a drive unit (not shown) which alters the positions of these components.

Also, shading correction plate 21 is provided in the vicinity of original document table 11, facing the initial position (home position H) of optical carriage 15, as a white reference plate for the shading correction described later.

The image of original document D can be read by image sensor 20 through the reciprocal operation of optical carriage 15 along the underside of original document table 11 for a distance corresponding to the size of original document D in the breadth scanning direction (to the left and right in FIG. 1).

In the center of laser beam printer 30, drum-shaped photosensitive body 31 is arranged. Surrounding photosensitive body 31, main charger 32, laser optical unit 33, developing device 39, pretransfer drum discharge lamp 40, transfer roller 41, and cleaning unit 56 are arranged in order in the rotation direction of photosensitive body 31. Blade 41a is provided at transfer roller 41 for scraping off any adhering toner.

Laser optical unit 33 is composed of the following, a semiconductor laser generator (not shown), such as a laser diode or the like, which generates a laser beam modulated in response to dot image data; a collimator lens (not shown) which makes parallel the laser beam output from the laser generator; rotating mirror (polygonal mirror) 34 which scans the output beam from the collimator lens; fθ lens 35 which passes the laser beam scanned by rotating mirror 34; reflecting mirrors 36 and 37 which reflect the laser beam which has passed through fθ lens 35 in the direction of photosensitive body 31, and correcting lens 38 which guides the laser beam reflected by reflecting mirrors 36 and 37 onto the surface of photosensitive body 31.

Paper supply cassettes 42 and 43, which can be freely installed and removed, are provided at one side of laser beam printer 30 so that the paper stored in paper supply cassettes 42 and 43 is extracted by paper feed rollers 42a or 43a respectively. Aligning roller pair 44, which transports the paper extracted from paper supply cassettes 42 and 43 at a timing taken from the forming of the toner image on the surface of photosensitive body 31, is provided beyond paper feed rollers 42a and 43a. Manual paper supply platform 45, which supplies paper manually, is provided above upper paper supply cassette 42. Feed rollers 46, 47 and 48, which feed the manually inserted paper to the position of aligning roller pair 44, are provided above manual paper supply platform 45.

Transport path 49 which extends through transfer roller 41, heat roller pair 50 as a fixing unit, paper exit selector 51 and paper exit roller pairs 52 and 54 are arranged downstream of the image transferring unit between photosensitive body 31 and transfer roller 41. Upper paper receiving tray 63, which receives paper selected by paper exit selector 51 and dispensed by exit roller pair 52, and lower paper receiving tray 55, which receives paper selected by paper exit selector 51 and dispensed by paper exit roller pair 54, are respectively provided on the other side of laser beam printer 30.

In the image forming operation, photosensitive body 31 is rotated and, at the same time, main charger 32 operates and the surface of photosensitive body 31 is uniformly charged. Next, exposure corresponding to the dot image data is carried out on photosensitive body 31 by laser optical unit 33, thus forming an electrostatic latent image. The electrostatic latent image on photosensitive body 31 is developed and a toner image is formed by developing device 39, which uses a two-component developing agent composed of a toner and a carrier. Then, the surface potential of photosensitive body 31 is reduced by pretransfer drum discharge lamp 40 to simplify the transferring of the toner image, and the toner image rotates to the image transferring unit.

At the same time, in synchronization with the toner image formation operation, paper selectively extracted from paper supply cassettes 42 or 43, or paper manually supplied by manual paper supply platform 45, is passed via aligning roller pair 44, and the toner image formed on photosensitive body 31 as described above is transferred onto the paper by the operation of transfer roller 41.

The paper on which the toner image is transferred passes along transport path 49 and is transported to heat roller pair 60. The toner image is fixed by passing through heat roller pair 50. After fixing, the dispense direction of the paper is selected by paper exit selector 51, and it is dispensed to upper paper receiving tray 53 or lower paper receiving tray 55. The paper on which an image is formed in response to the image data obtained when optical carriage 15 scans original document D from left to right in FIG. 1 (during forward operation is dispensed to upper paper receiving tray 53. The paper on which an image is formed in response to the image data obtained when optical carriage 15 scans original document D from right to left in FIG. 1 (during backward operation) is dispensed to lower paper receiving tray 55.

After the toner image has been transferred onto the paper, any residual toner on the surface of photosensitive body 31 is cleaned off by cleaning unit 56, and it is put into a state in which it is ready for the next image forming operation.

Figure 2:
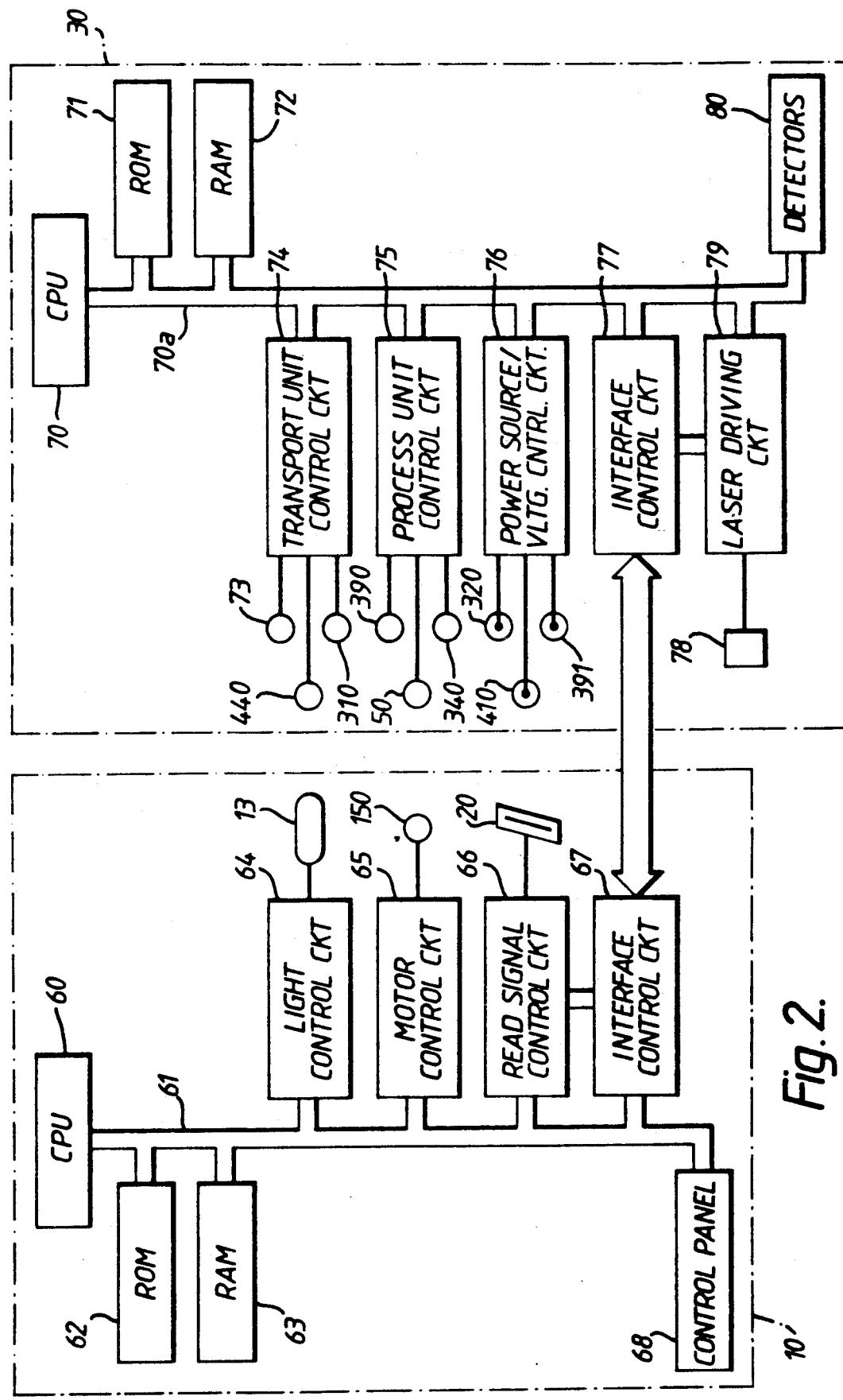
FIG. 2 is a block diagram showing the overall control circuit of the digital type copier shown in FIG. 1.

FIG. 2 shows the electrical circuits of a digital photocopier constructed as described above. In image scanner 10, CPU controls the overall operation of the digital photocopier, and the following are connected to CPU 60 via CPU bus 61; program ROM (Read Only Memory) 62 for control; RAM (Random Access Memory) 63 in which the travel amounts (numbers of steps) of optical carriage 15 according to the sizes of original document D are stored; light controlling circuit 64 which controls the switching and amount of exposure of illuminating lamp 13; motor control circuit 65 which controls driving motor (for instance, pulse motor) 150 for shifting the position of optical carriage 15; read signal control circuit 66 which drives and controls image sensor 20; interface control circuit 67 for connecting with laser beam printer 30, and control panel 68.

Although they are omitted from the drawing, signals from various sensors are input to CPU 60 and, at the same time, the driving motor which shifts the position of sub-carriage 18 in response to variations of the magnification is connected to CPU 60, which is also designed to control these.

On the other hand, in laser beam printer 30, CPU (Central Processing Unit) 70 controls the overall of laser beam printer 30, and the following are connected to CPU 70 via CPU bus 70a; program ROM 71 for control; RAM 72; transport unit control circuit 74; process unit control circuit 75; power source/voltage control circuit 76; interface control circuit 77 for connecting with image scanner 10; laser driving circuit 79 for controlling semiconductor laser generator 78, and various detectors 80.

Transport unit control circuit 74 controls paper supply motor 73 which selectively drives paper supply rollers 42a and 43a and feed rollers 46, 47 and 48; aligning roller drive motor 440 which drives aligning roller pair 44, and drum drive motor 310 which rotates photosensitive body 31.

Process unit control circuit 76 controls developing motor 390 which drives developing device 39; the heater of heat roller pair 50, and polygon motor 340 which drives rotating mirror 34.

Power source/voltage control circuit 76 controls high voltage transformer 320 which drives main charger 32; high voltage power source 410 which drives transfer roller 41, and developing bias 391 of developing device 39.

Figure 3:
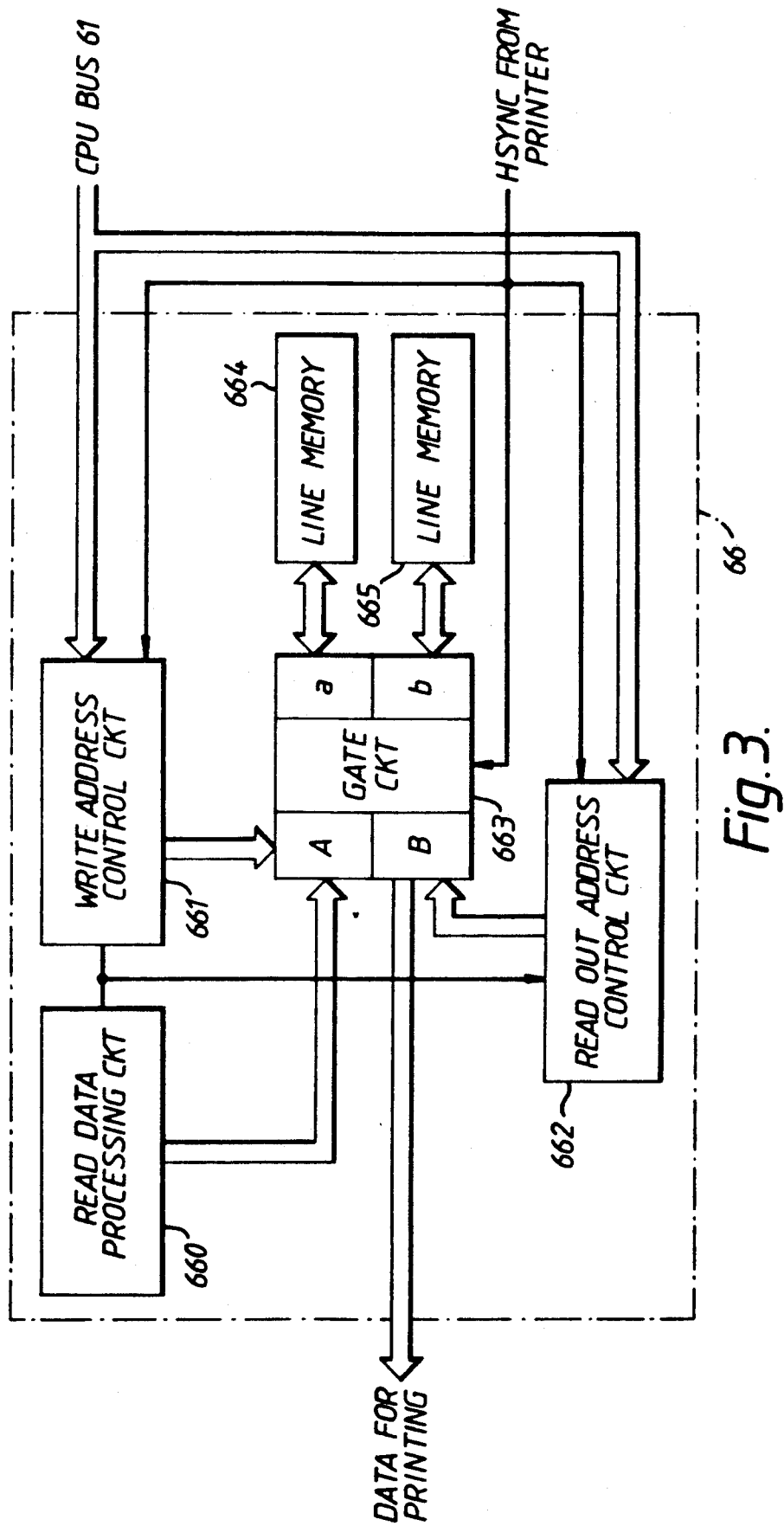
FIG. 3 is a block diagram showing the read signal control circuit in the overall control circuit shown in FIG. 2.

FIG. 3 shows the composition of read signal control circuit 66. Read signal control circuit 66 comprises read data processing circuit 660, write address control circuit 661, read-out address control circuit 662, gate circuit 663, and a pair of line memories 664 and 665.

Figure 4:
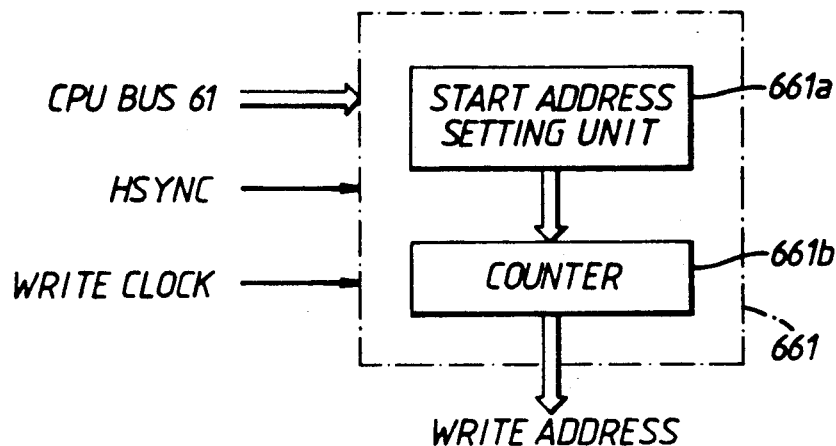
FIG. 4 is a block diagram showing the write address control circuit in the read signal control circuit shown in FIG. 3.

In FIG. 3, when an HSYNC signal (line synchronization signal) is supplied from laser beam printer 30, read signal control circuit 66 switches the connections between gates A and B and gates a and b of gate circuit 663. For instance, if gates A and a and gates B and b of gate circuit 663 are in the connected state, image data from image sensor 20, which is supplied via read data processing circuit 660, is written into line memory 664. At this time, the address control of line memory 664 is executed by line address control circuit 661. That is, as shown in FIG. 4, the start address is set in start address setting unit 661a by CPU 60 of image scanner 10, and counter 661b counts up by step-widths 1 from that start address. This count-up is carried out in synchronization with every one picture element of the write clock (write pulse) supplied from the timing production circuit in read data processing circuit 660 which is described later.

When the reading of a 1-line portion is complete, gate circuit 663 switches the the state of connections to A to b and B to a by a line synchronizing signal (HSYNC signal) from laser beam printer 30. By this means, the image data from image sensor 20 which is supplied from read data processing circuit 660 is written into line memory 665. At this time also, address control of line memory 665 is carried out by write address control circuit 661 in a similar way to that described above.

Figure 5:
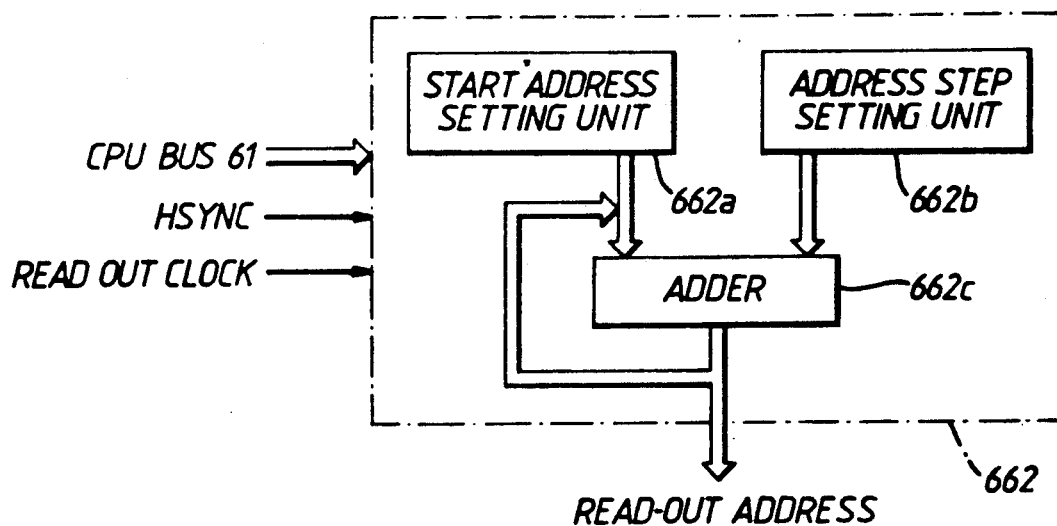
FIG. 5 is a block diagram showing the read-out address control circuit in the read signal control circuit shown in FIG. 3.

On the other hand, at this time, the image data in line memory 664 is read out as print data (bit image data) to laser beam printer 30 via gate circuit 663. The address control of line memory 664 at this time is carried out by read-out address control circuit 662. That is, in read-out address control circuit 662, as shown in FIG. 5, the start address is set in start address setting unit 662a by CPU 60 of image scanner 10. The address steps are also set in address step setting unit 662b by CPU 60 of image scanner 10. Adder 662c increases by the specified step-width from this start address at every read-out clock. In this case, if the start address is 0 and the step-width is 1 (in this embodiment it is a copy corresponding to A3-400dpi) the address step changes from 0 to 4676 by step-widths 1.

Since read-out address control circuit 662 is composed of an adder, this read-out address control circuit 662 has a different function from write address control circuit 661. That is, when the address step is a number which includes a decimal point less than 1, the output address is only output in integers. However, internally it is designed to count decimal parts as well. Therefore, sometimes the same address is doubly output, and an enlarged copy can be obtained by this means. Also, when the address step is a number greater than 1, conversely, a reduced copy is obtained. Moreover, in the case of reduced copies, sometimes part-way through, the address output exceeds the write domain of line memories 664 and 665. In such a case, this can be resolved by providing a device (not shown) for normarizing read-out data in line memories 664 and 665 as non-print data.

Also, when the start address is a normal final address and the address step is a minus number, the design is such that line memories 664 and 665 can read out data inversely. For this reason, a regular image which is a mirror conversion of an erect image in which top and bottom are reversed can be obtained. Through this reverse read-out function of data from line memories 664 and 665, the forming of an image, even during the backward operation of optical carriage 15, becomes possible in this invention.

FIGS. 6A, 6B and 6C, shows examples of the write address and the write pulse, the read address for equal magnification and the read address for mirror image conversion respectively in read signal control circuit 66.

Figure 7A:
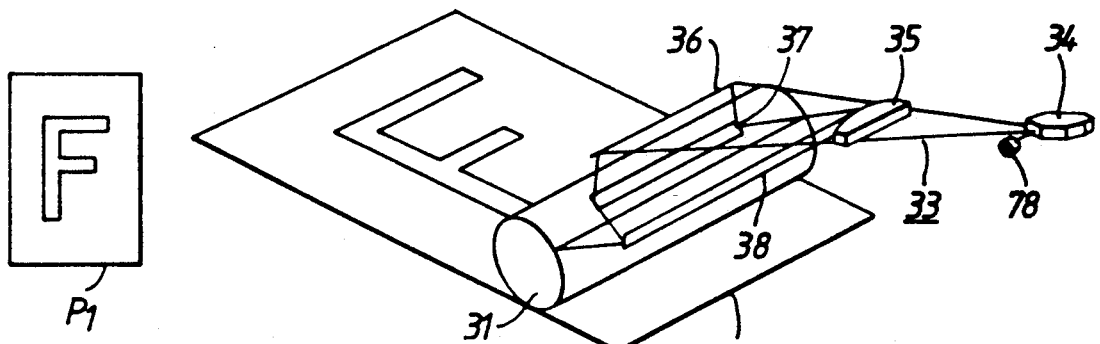
FIG. 7A to 7C are diagrams illustrating the image forming operation.
Figure 7B:
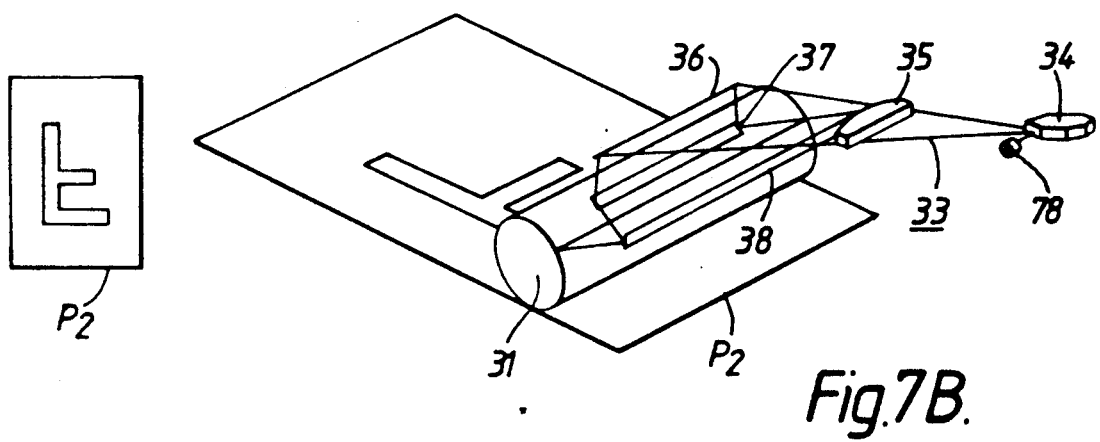
Figure 7C:
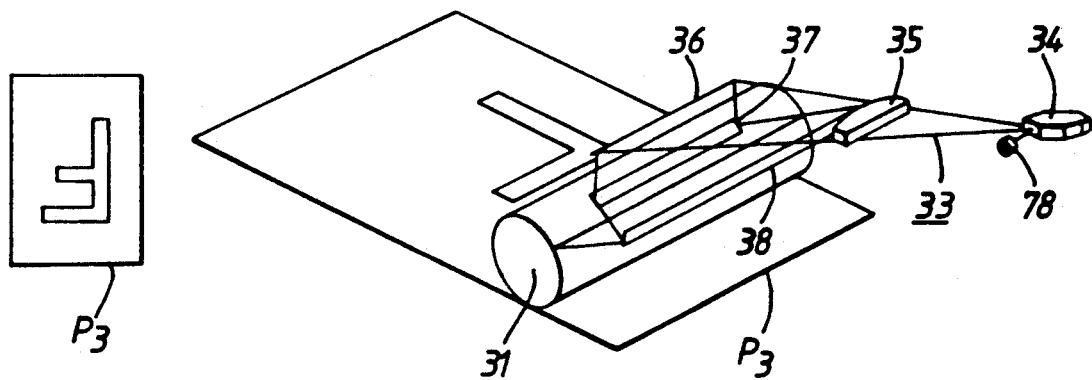

FIGS. 7A to 7C show examples of the scanning directions of original document D by optical carriage 15 of image scanner 10 and of the images formed by these. FIG. 7A shows the state in which the image is formed on paper $P_1$, when optical carriage 15 has scanned original document D by forward operation from left to right, i.e., from the leading edge Da of original document D to the trailing edge Db of original document D in FIG. 1. Also, FIGS. 7B and 7C show states in which the image is formed on papers $P_2$ and $P_3$ when optical carriage 15 has scanned original document D by backward operation from right to left, i.e., from the trailing edge Db of original document D to the leading edge Da of original document D in FIG. 1.

In this case, when the image data in line memories 664 and 665 shown in FIG. 3 are read in the same way as in the forward operation in FIG. 7A, the image formation state becomes as in FIG. 7B. That is, when original document D is scanned by the backward operation of optical carriage 15, and the image data obtained by this scanning is read from memories 664 and 665 in the same way as for the forward operation of optical carriage 15, the image on paper $P_2$ obtained in this way becomes a back to front mirror conversion image of the erect image, and is therefore of no practical use.

Therefore, the above-mentioned function of read-out address control circuit 662 of reading out line memories 664 and 665 in reverse order is utilized. Thus, when optical carriage 15 scans original document D by backward operation from right to left, line memories 664 and 665 are read out in an order which is the reverse of that for the forward operation of optical carriage 15. Thus, as shown in FIG. 7C, a regular image similar to that in FIG. 7A can be obtained. The image obtained in this way becomes a top to bottom reversal image for paper $P_3$ When compared with the case in FIG. 7A. The result is the same image (a regular image). However, when images are formed on a large number of sheets of paper in succession, the result is a mixture of papers P, with regular erect images as shown in FIG. 7A and papers $P_3$ on which the images are top to bottom mirror image conversions. Since, because of this, difficulties frequently arise in the processing after image formation, the design is that, by dividing papers $P_1$ and $P_3$ on which the two types of image are formed into two and dispensing them into separate upper and lower receiving trays 53 and 55, the papers are separately collected without mixing erect images with top to bottom reversal images. Also, in this case by dispensing the erect images ($P_1$) into upper receiving tray 53, visual checking of the image formation state by the operator becomes simple.

Figure 8:
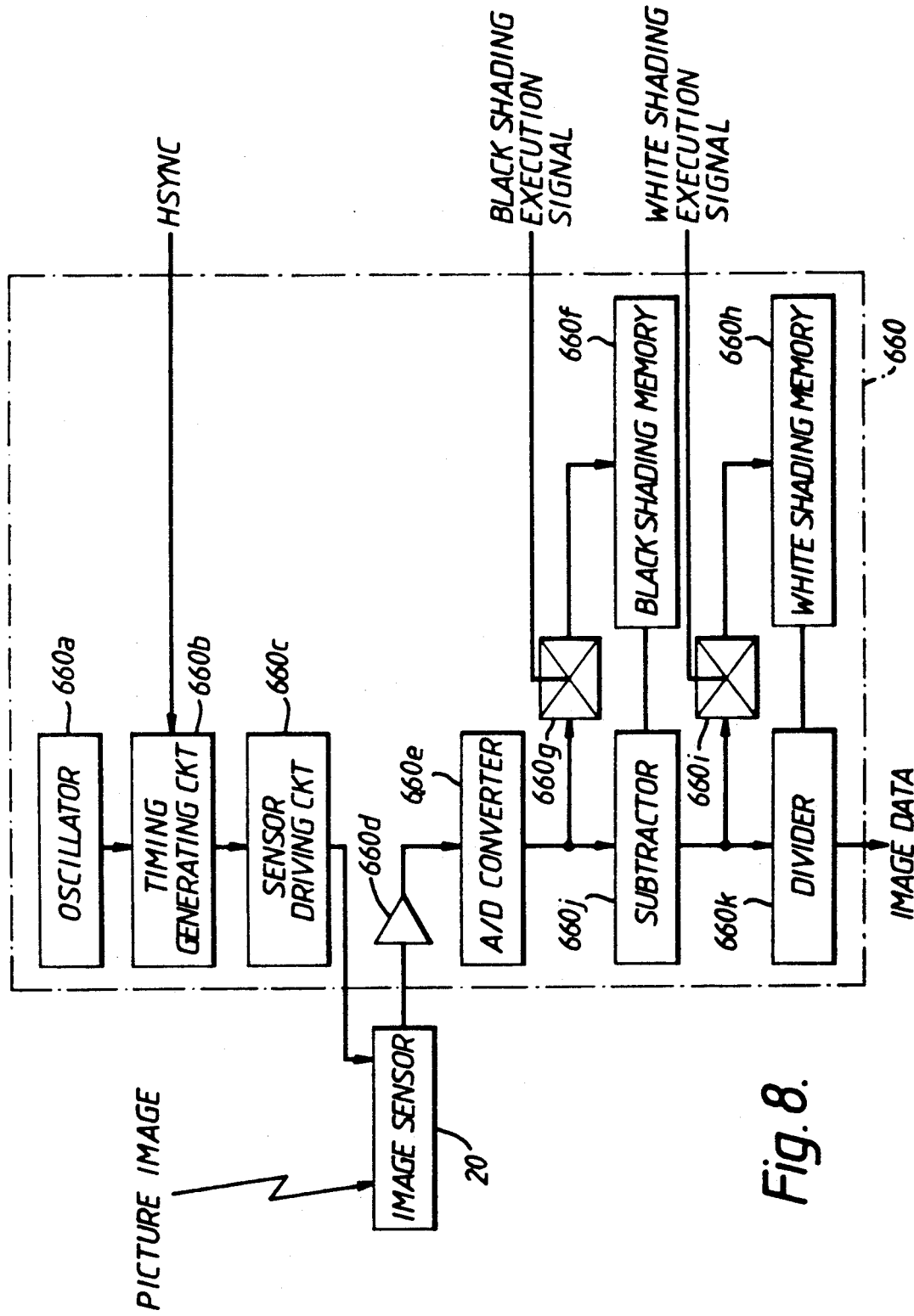
FIG. 8 is a block diagram showing the composition of the read data processing circuit.

FIG. 8 shows the composition of read data processing circuit (peripheral circuit of image sensor 20) 660.

In FIG. 8, timing generating circuit 660b generates various signals (writing clocks) which operate image sensor 20 by pulses from oscillator 660a in synchronization with the HSYNC signal from laser beam printer 30. These various signals are amplified to large volume signals by sensor driving circuit (CCD driver) 660c, and drive image sensor 20. The analog signals from image sensor 20 driven in this way are amplified to several times their voltage values by amplifier 660d and are then converted to digital signals by A/D converter 660e.

Black shading memory 660f stores the signal read when illuminating lamp 13 in optical carriage 15 is not switched ON as the offset value of image sensor 20. When the signal is stored in black shading memory 660f, gate 660g is released by a black shading execution signal from CPU 60.

Also, in the state with illuminating lamp 13 switched ON by CPU 60, white shading memory 660h stores the signal which is the subtraction by subtractor 660j of the black shading value from the signal read when optical carriage 15 is facing shading correction plate 21 which is the white color reference plate. This white shading value is the data for correcting random exposure of illuminating lamp 13 and the random sensitivity of image sensor 20. This data is stored in memory 660h with the release of gate 660i by a white shading execution signal.

Here, the read scanning of original document D is described. Normally, optical carriage 15 is stopped in the position H facing shading correction plate 21. After completion of storage of the black shading value in black shading memory 660f and the white shading value in white shading memory 660h, the read scanning of original document D commences. The offset correction of sensor 20 is executed by subtraction of the black shading value from the digital signal converted by A/D converter 660e from the signal read by image sensor 20. Then, the random exposure of illuminating lamp 13 and the random sensitivity of image sensor 20 are corrected by dividing by the white shading value in divider 660k. The image data obtained in this way are transmitted to line memories 664 and 665 via gate circuit 663 as described above.

The storage of the black shading value in black shading memory 660f is executed once at the commencement of the image forming operation, while the storage of the white shading value in white shading memory 660h is executed every time optical carriage 15 scans an original document. However, in this embodiment, taking account of the facts that there is little change in the light quantity of illuminating lamp 13 and that there is little change in the sensitivity of image sensor 20, the re-write operation of white shading memory 660h during the backward operation of optical carriage 16 has been omitted. That is, the re-write operation of white shading memory 660h is designed to be executed only at the commencement of the forward operation of optical carriage 15. By this means, since there is no requirement to provide a shading correction plate at the point of commencement of backward operation (on the trailing edge Db side of original document D in FIG. 1), simplification can be designed space-wise and operation-wise.

Figure 9:
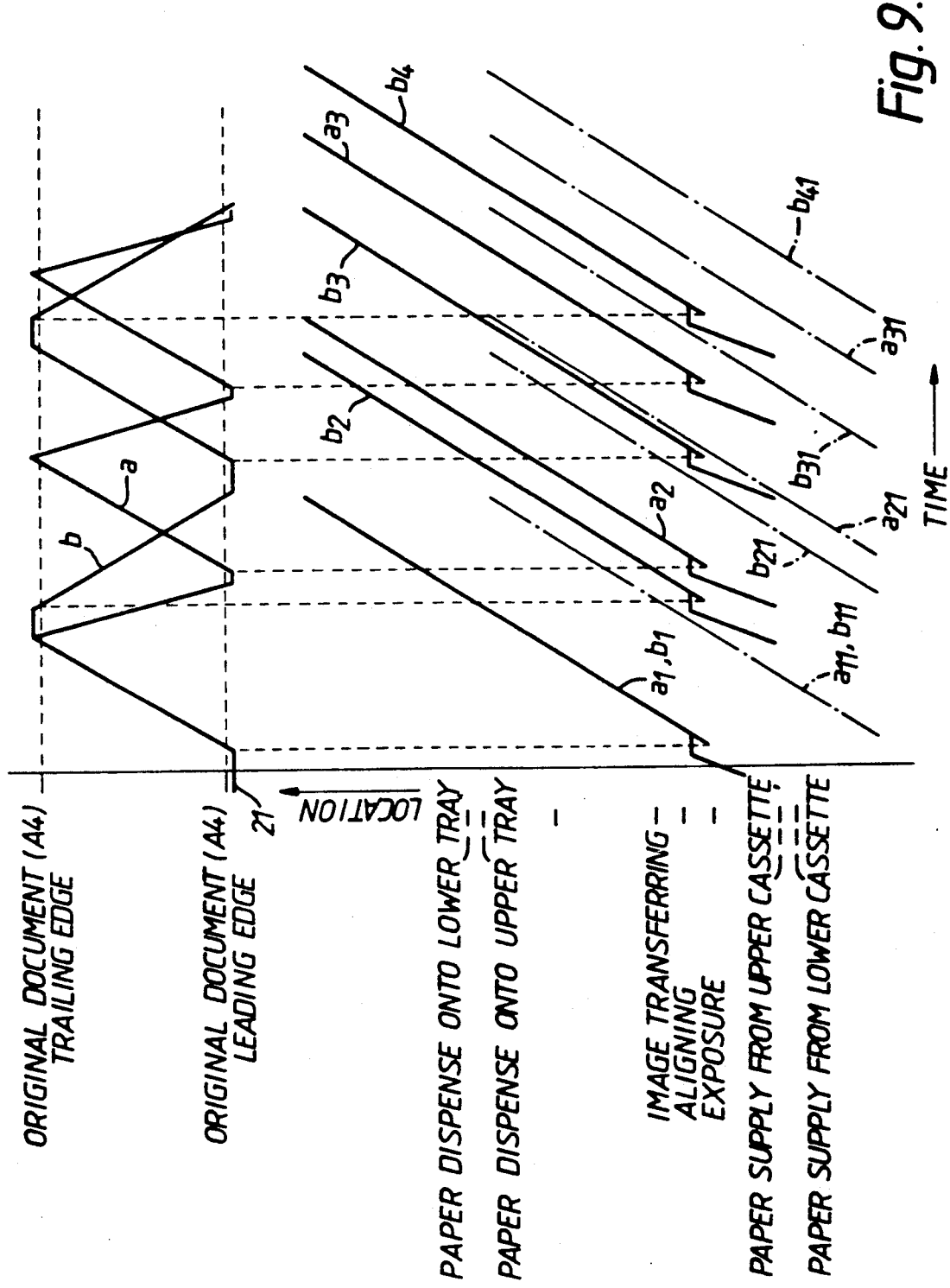
FIG. 9 is a diagram illustrating the relationship between the optical carriage and the image forming operation.

FIG. 9 is a diagram showing the relationship between the movement of optical carriage 18 in image scanner 10 and the image forming operation of laser beam printer 30. In the diagram, the movement of optical carriage 15 is shown in the upper part, and the movements of the leading edge (solid line) and the trailing edge (single-dot chain line) of paper P in laser beam printer 30 are shown in the lower part, respectively. Thick line a in the diagram shows the movement when the image forming operation is being carried out only during the forward operation of optical carriage 15 (the scanning of optical carriage 15 from left to right in FIG. 1), while thin line b ($a_1$, $b_1$ and $a_{11}$, $b_{11}$ of the first sheet of paper P are common) shows the movement when image forming is being carried out not only during the forward operation of optical carriage 15, but also during the backward operation. Reference signs $a_1$, $b_1$ are the leading edge of the first sheet of paper P, $a_{11}$, $b_{11}$ are the trailing edge of the first sheet of paper P, $a_2$, $b_2$ are the leading edge of the second sheet of paper P, $a_{21}$, $b_{21}$ are the trailing edge of the second sheet of paper P, $a_3$, $b_3$ are the leading edge of the third sheet of paper P, $a_{31}$, $b_{31}$ are the trailing edge of the third sheet of paper P, $a_4$, $b_4$ are the leading edge of the fourth sheet of paper P and $a_{41}$, $b_{41}$ are the trailing edge of the fourth sheet of paper P.

As is clear from this diagram, for instance, during the time that three copies of A4 size paper P can be made in the image forming apparatus during forward operation only, it is possible to make about four copies in a apparatus which can carry out image formation during both forward and backward operation. In fact, copying can be speeded up to 38 sheets instead of the 30 sheets in a apparatus which only copies during forward operation.

Figure 10:
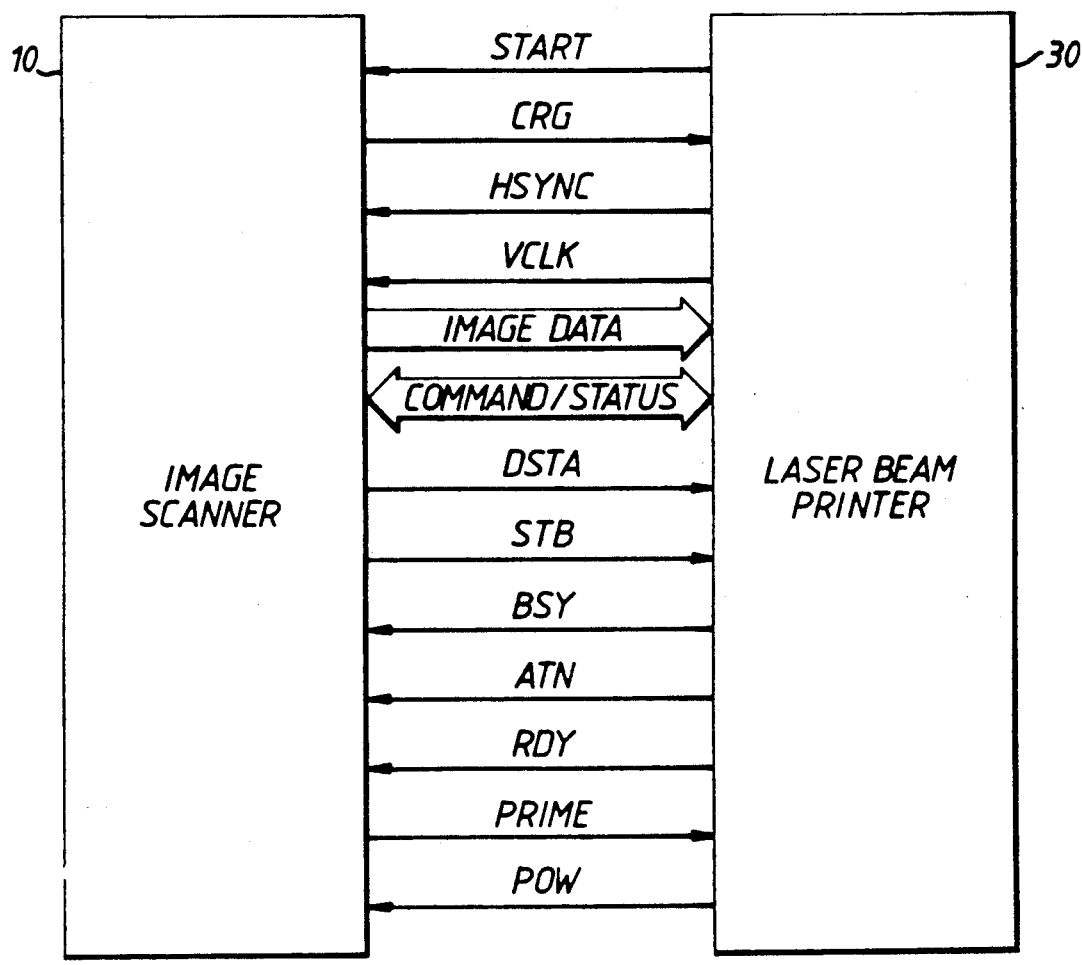
FIG. 10 is a diagram showing an example of the interface signals which are exchanged between the scanner and the laser beam printer.

FIG. 10 shows the interface signals which are exchanged between laser beam printer 30 and image scanner 10. The lines which transmit command/status are an 8-bit bus system, and this is used by switching command and status with a DSTA signal from image scanner 10.

There are 8 lines which transmit image data. The number of lines differs depending on the number of gradations of the image data. However, in this embodiment, 256 value gradations are provided for one picture element, and one picture element is transmitted for one clock. One line may be used in the case of binary. Also, even in the case of binary, when the data of a large number of picture elements is transmitted for one clock, the number of lines for the data of that portion is required.

The START signal is the signal output by laser beam printer 30 to image scanner 10 to demand the start of operation of optical carriage 15.

The CRG signal is a signal which shows that image scanner 10 has started the operation of optical carriage 15 in response to the START signal.

The HSYNC signal is the signal output by laser beam printer 30 in response to the CRG signal after the START signal is released.

The VCLK signal is a signal output from laser beam printer 30 to image scanner 10 for the transmission of image data. In response to this, image scanner 10 transmits image data using the VCLK signal.

The DSTA signal is the signal from image scanner 10 to switch the command/status bus to the command side when transmitting a command to laser beam printer 30.

The STB signal is a signal to inform that command data have been transmitted.

The BSY signal is a signal to inform that command data have been received. This BSY signal is returned to its origin after completion of preparation of the status corresponding to the result of interpreting it.

The ATN signal is a signal to transmit to image scanner 10 the fact that the basic status of laser beam printer 30 has been changed.

The RDY signal is a signal showing that laser beam printer 30 is in the "Ready" state.

The PRIME signal is a signal by which image scanner 10 demands the initialization of laser beam printer 30.

The POW signal is a signal which shows that power is supplied to laser beam printer 30.

Figure 11:
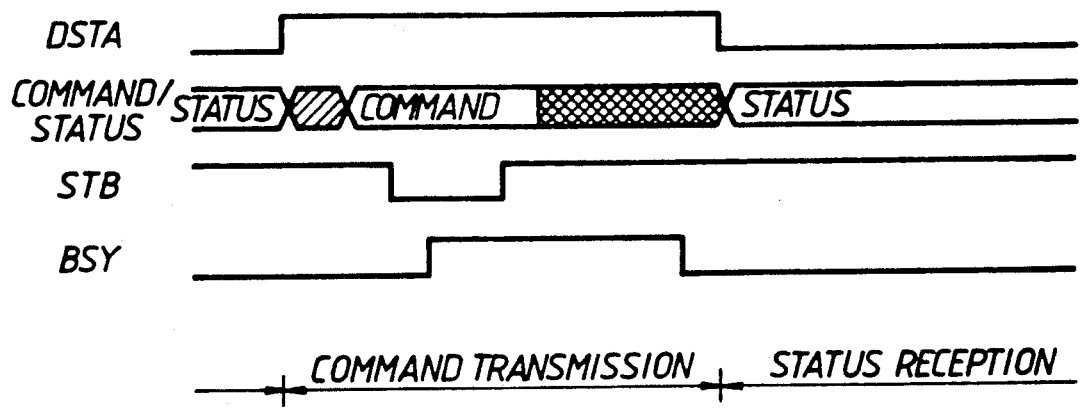
FIG. 11 is a timing chart showing the command/status exchange which is executed between the scanner and the laser beam printer.

FIG. 11 is a diagram showing the state of signals when there is exchange of command/status between laser beam printer 30 and image scanner 10. When image scanner 10 transmits a command to laser beam printer 30, the command/status is shifted to "Command" beforehand by the DSTA signal, and then command data is transmitted on the bus, and the partner device (laser beam printer 30) is informed by the STB signal that it has been transmitted. In response to this, laser beam printer 30 informs image scanner 10 by the BSY signal that the data has been received, and the BSY signal is returned to its origin after completion of preparing the status in response to interpreting the data. The DSTA signal is returned to its origin by image scanner 10 returning the BSY signal to its origin, and the status is read from laser beam printer 30.

Figure 12:
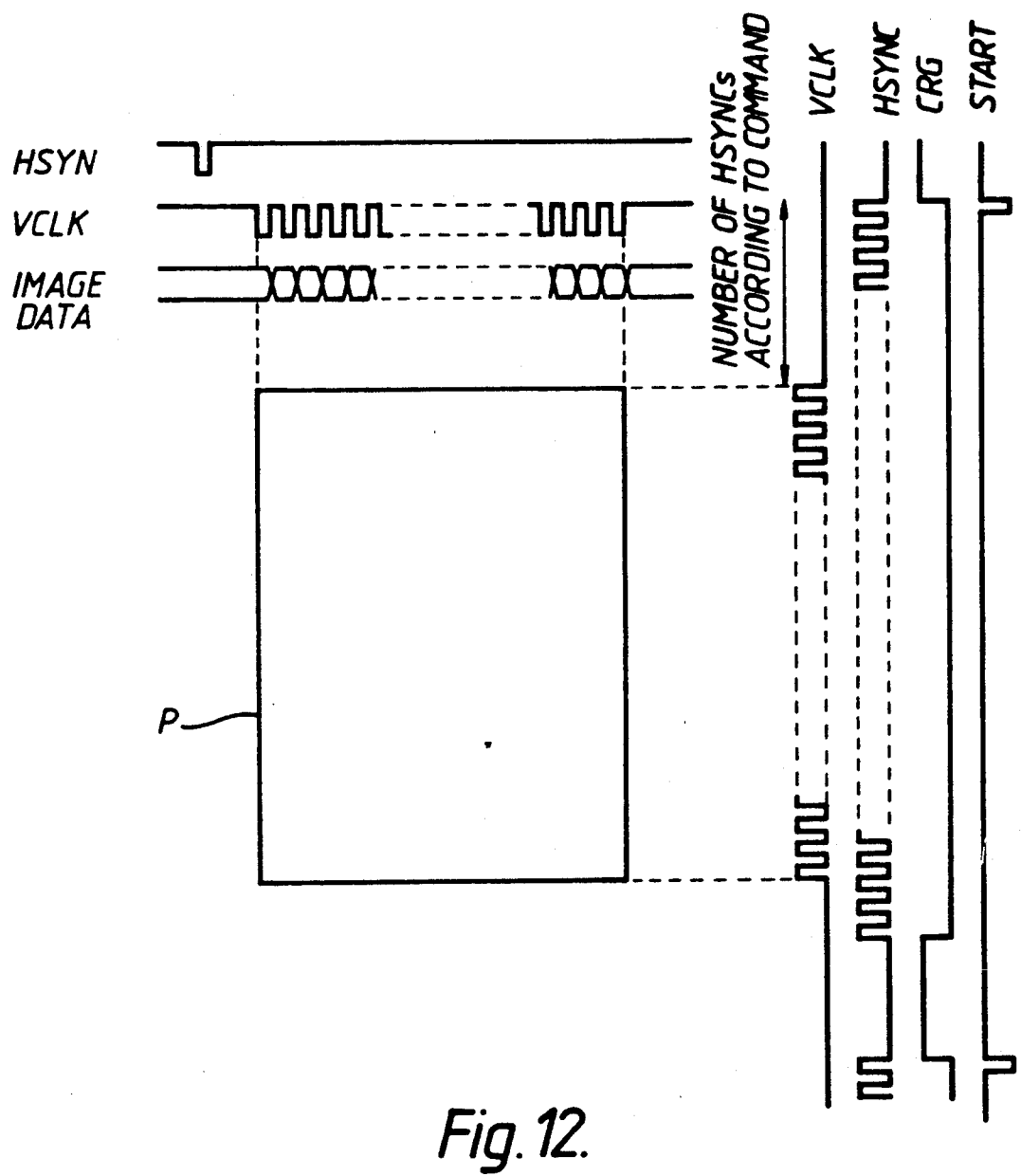
FIG. 12 is a diagram illustrating the timing of the image data exchange executed between the scanner and the laser beam printer.

FIG. 12 shows the state of each signal during the transmission of image data.

When laser beam printer 30 has completed paper supply from cassettes 42 and 43 or from manual supply platform 45 to aligning roller pair 44 and is prepared for synchronization with image scanner 10 as a command data, it switches ON the START signal which demands that scanner system 10 start the operation of optical carriage 15. When, in response to this, image scanner 10 starts the operation of optical carriage 15 and switches ON the CRG signal, laser beam printer 30 releases the START signal and starts to transmit the HSYNC signal. In this case, when the required time for synchronization with image scanner 10, which is transmitted from image scanner 10, has elapsed, laser beam printer 30 transmits to image scanner 10 he VCLK signal which is the image data transmission signal. Image scanner 10 transmits image data on this VCLK signal. In the case of this embodiment, the required time for synchronization with image scanner 10 is indicated by the number of HSYNC signals which are sent to image scanner 10 by laser beam printer 30. Therefore, the HSYNC signals are counted down inside laser beam printer 30, and when 0 (zero) is reached laser beam printer 30 starts to transmit the VCLK signal.

Here, the commands which image scanner 10 transmits to laser beam printer 30 are described. A normal command is 1 byte composed of a parity bit (1 bit), type bits (3 bits) which indicate the type of command and information bits (4 bits) which indicate the detailed information of the command.

Also, the synchronization time designator command forms 1 command with a series of 3 bytes. The design is that the following 2 bytes designate the synchronization time with the number of HSYNC signals through the order of the upper position byte and the lower position byte.

Next, the synchronization of image scanner 10 and laser laser beam printer 30 is described in detail. Here, an example is described for the case of using a pulse motor as driving motor 150 for optical carriage 15.

Usually, pulse motors are motors capable of accurate control. That is, provided the speed is within the response zone of the motor, it will operate accurately in response to the number of pulses which are applied. Also, by storing the number of pluses which have been applied, the position can be accurately obtained by their count. The characteristics of this type of pulse motor are most suitable for the control of optical carriage 15. For instance, when the copy magnification is 100% (equal magnification copy), if the moving speed of optical carriage 15 is taken as 166 mm/sec when the pulse motor is operated at 2,250 pps, the fact that 13.5 pulses are required to move optical carriage 15 1 mm can be simply obtained.

Also, although the pulse motor will become maladjusted and will not operate with a sudden rush of pulses, it has the characteristic of moving in response even to rapid pulses by increasing gradually to a high frequency from a low frequency. In this case, care should be taken to increase the pulse rate, so that isometric acceleration operation is achieved. From these characteristics, the required times for increasing the pulse rate due to the differences in final speed, the pulse numbers and the distances can be accurately obtained by calculation.

In this embodiment, the distance from the position of shading correction plate 21, which is the home position of optical carriage 15, to the leading edge Da of original document D is made 10 mm. The time required to move this distance differs due to the various magnifications, such as reduction and enlargement. This time is equivalent to the time from optical carriage 15 having been moved to starting to output image data, and for laser beam printer 30 it becomes the synchronization time from the designation of the commencement of scanning by optical carriage 15 to the receipt of image data. This synchronization time differs in individual devices due to slight differences in the distance from the home position H to the leading edge Da of original document D caused by errors in assembly of the system.

Therefore, in image scanner 10, the synchronization times (the numbers of HSYNC signals) are calculated from the various magnifications and the distance to the leading edge Da of original document D, using standard synchronization times during forward operation at various magnifications and the numbers when those times are converted to HSYNC signals (line synchronization signals) and correction factors when taking account of slippage. Then, these are transmitted to laser beam printer 30 beforehand as the synchronization time designator command.

At the same time, after the paper supply is completed and the state of being in synchronization has been achieved, the commencement of operation of optical carriage 15 is designated to image scanner 10 by laser beam printer 30. Then, after optical carriage 15 has started, the HSYNC signals are counted and synchronization with image scanner 10 is executed.

In this way, the synchronization time is expressed by the number of HSYNC signals. The commencement of transmission of image data is executed in synchronization with the HSYNC signals and does not start in the middle of a line, and therefore it is most suitable as the object of a coefficient.

The above is the method of executing synchronization during the forward operation of optical carriage 15, but synchronization during backward operation differs according to the individual occasions. When the forward operation of carriage 15 is completed and as soon as the transmission of image data is completed, image scanner 10 stops moving carriage 15 in the minimum time. The time required for stopping differs depending on the speed of scanning. However, when the speed is reduced by the reverse use of the same data as when speeding up at the commencement of scanning, this can be simply achieved, and synchronization in the backward operation can be executed with the same timing as this timing. The synchronization time during backward operation can be shorter than the synchronization time during forward operation.

Since it is possible to operate the system in response to the shortest synchronization time using the copy magnification and the scanning speed on the various individual occasions in this way, the copying speed can be increased.

Next, the operation in the above composition is described.

For instance, assume that original document D is now placed on original document table 11 and the "Start" key (not shown) of operator panel 68 is operated. When this is done, CPU 60 of image scanner 10 will first calculate the synchronization time from the magnification of the image and the distance from the home position H in which optical carriage 16 is stopped to the leading edge Da of original document D, and then transmit the result of this calculation to laser beam printer 30 via interface control circuit 67.

At the same time, in laser beam printer 30, paper supply is started by controlling transport unit control circuit 74 using CPU 70 and driving paper supply motor 73. Then, when paper supply is completed and the state of synchronization with image scanner 10 has been achieved, the starting of optical carriage 15 is designated to image scanner 10 via interface control circuit 77. After this, when carriage 15 is started, synchronization with image scanner 10 is executed by counting the HSYNC signals.

At the same time, in image scanner 10, in response to the designation from laser beam printer 30, illuminating lamp 13 is switched ON by controlling light control circuit 64 and, at the same time, driving motor 150 is driven by controlling motor control circuit 65. Then, after optical carriage 15 has been made to face shading correction plate 21 and the black shading value and the white shading value have been set in black and white shading memories 660f and 660h respectively, the scanning of original document D by optical carriage 15 commences. After this, in response to a signal sent by laser beam printer 30 after the time required for synchronization has elapsed, original document D is read by image sensor 20. The image data, corrected for the offset correction and the random sensitivity of sensor 20 and the random exposure of illuminating lamp 13 by read signal control circuit 66, is transmitted to laser beam printer 30 from interface control circuit 67. Also, when the scanning of original document D is completed, optical carriage 15 is returned to the home position by backward motion.

Also, in laser laser beam printer 30, CPU 70 controls process unit control circuit 75, power source/voltage control circuit 76 and laser driving circuit 79, and an image is formed on paper P supplied by aligning roller pair 44. In this case, as shown in FIG. 7A, the image formed on paper P is regarded as a regular erect image. That is, the image data supplied from image scanner 10 is the data read during the forward operation of optical carriage 15 moving from the left to the right of original document table 11. Therefore, a regular image is formed as it stands on paper P.

Paper P on which an image has been formed in this way is transported to paper exit roller pair 52 via paper exit selector 51, and is dispensed on upper paper receiving tray 53 by this roller pair 52. The above is the operation in the case of a one-shot image formation being executed in laser beam printer 30. That is, it is the operation when an image is formed on one sheet of paper P and output.

Next, the operation when image formation is carried out on a number of sheets of paper P in succession is described.

When a number of copies is set on operator panel 68, CPU 60 of image scanner 10 executes the reading of original document D by operating optical carriage 15 in the forward direction as described above. At the same time, it makes optical carriage 15 wait at the waiting position E of completion of reading (FIG. 1). Then, when it has been indicated that an image has been formed on the the first sheet of paper P and it has been dispensed to upper paper receiving tray 63, CPU 60 of image scanner 10 first calculates the synchronization time from the image magnification and the distance from the waiting position E in which optical carriage 15 is waiting to the trailing edge Db of original document D, and then transmits the result of this calculation to laser beam printer 10 via interface control circuit 67.

Also, in image scanner 10, the backward operation of carriage 15 is commenced in response to a signal which designates the start of optical carriage 15 from laser beam printer 30 in the same way as above. After this, in response to a signal which is transmitted by laser beam printer 30 after the time required for synchronization has elapsed, the data is read by image sensor 20. Then the image data, corrected for the offset correction and the random sensitivity of sensor 20 and the random exposure of illuminating lamp 13 by read signal control circuit 66, is transmitted to laser beam printer 30 from interface control circuit 67.

In this case the design is that, in read signal control circuit 66, the image data which has been read by image sensor 20 is read out in reverse for every line stored in line memories 664 and 665. Therefore, the image formed on paper P becomes a regular image which is a top to bottom mirror conversion of the erect image, as shown on FIG. 7C. That is, the image data supplied from image scanner 10 is the data which is read by the backward operation of optical carriage 15 from the right to the left of original document table 11. Therefore, a regular image is formed with top and bottom reversed on paper P.

After this, paper P on which the image is formed is transported to paper exit roller pair 54 via paper exit selector 51 and is dispensed on lower paper receiving tray 55 by this roller pair 54.

By this means, the formation of the respective images is executed on sheets of paper P to the number of copies set as described above in response to the forward and the backward operations of optical carriage 15. Paper P on which an image has been formed according to the image data read during the forward operation of carriage 15 is dispensed on upper paper receiving tray 53. Also, paper P on which an image has been formed according to the image data read during the backward operation of carriage 15 is dispensed on lower paper receiving tray 55.

As described above, the design is that the backward operation of the optical carriage in the image scanner is caused to contribute to the image forming by the laser beam printer and, at the same time, the image forming operation is controlled at the minimum synchronization time when required. By this means, it becomes possible to form an image, not only during the forward operation, but also during the backward operation of the optical carriage and, at the same time the system can be operated on the minimum synchronization time without any waste. Therefore, the copying speed as a copier can be markedly improved.

Various other modifications could be made in the present invention without departing from the scope or spirit of the following claims.

What is claimed is:

1. An image forming apparatus comprising;
   means for scanning an original document to read an image data of the original document;
   means for designating a magnification ratio of the image data read by the scanning means;
   means for forming an image on an image boarding member corresponding to the image data read by the scanning means, the image forming means including means for generating HSYNC (line synchronizing) signals;
   means for generating a command data representing a period of time required from the commencement of operation of the scanning means to the commencement of outputting the image data from the scanning means in accordance with the magnification ratio designated by the designating means, the command data generating means including means for calculating the number of the HSYNC signals corresponding to the command data based on the magnification ratio inputted by the designating means; and
   means for performing an image forming operation of the forming means in accordance with the command data generated by the generating means.

2. The apparatus of claim 1, wherein the command data generated by the command data generating means represents the number of the HSYNC signals.

3. The apparatus of claim 1, wherein the original document has a first edge and a second edge opposed to the first edge.

4. The apparatus of claim 3, wherein the scanning means includes means for illuminating the original document.

5. The apparatus of claim 4, wherein the scanning means also includes means for moving the illuminating means from a first position corresponding to the home position of the illuminating means to a third position corresponding to the second edge of the original document via a second position corresponding to the first edge of the original document.

6. An image forming apparatus comprising:
   means for scanning an original document, which has a first edge and a second edge opposed to the first edge, to read an image data of the original document;
   means for moving the scanning means from a first position corresponding to the home position of the scanning means to a third position corresponding to the second edge of the original document via a second position corresponding to the first edge of the original document;
   means for designating a magnification ratio of the image data read by the scanning means;
   means for forming an image on an image bearing member corresponding to the image data read by the scanning means, the image forming means including means for generating HSYNC (line synchronizing) signals;
   means for generating a command data representing a period of time required from the commencement of operation of the scanning means to the commencement of outputting the image data from the scanning means in accordance with the magnification ratio designated by the designating means, the command data generating means including means for calculating the number of the HSYNC signals corresponding to the command data based on the magnification ratio inputted by the designating means and the distance between the first position corresponding to the home position of the scanning means and the first edge of the original document; and
   means for performing an image forming operation of the forming means in accordance with the command data generated by the generating means.

7. The apparatus of claim 6, wherein the performing means includes means for counting the HSYNC signals.

8. The apparatus of claim 7, wherein the performing means also includes means for transmitting VCLK signals as the image data transmission signals to the scanning means when the counting means counts down the HSYNC signals to zero.

9. The apparatus of claim 8, wherein the scanning means includes means for transmitting the image data on the VCLK signals to the image forming means when the counting means counts down the HSYNC signals to zero.

10. An image forming apparatus comprising;
    means for scanning an original document to read an image data of the original document;
    means for designating a magnification ratio of the image data read by the scanning means;
    means for forming an image on an image bearing member corresponding to the image data read by the scanning means, the image forming means including means for generating HSYNC (line synchronization) signals;
    means for generating a command data representing a period of time required from the commencement of operation of the scanning means to the commencement of outputting the image data from the scanning means in accordance with the magnification ratio designated by the designating means, the command data generating means including means for calculating the number of the HSYNC signals corresponding to the command data based on the magnification ratio inputted by the designating means; and
    means for controlling the commencement of the image forming operation of the forming means in accordance with the command data generated by the generating means.

11. The apparatus of claim 10, wherein the original document has a first edge and a second edge opposed to the first edge.

12. The apparatus of claim 11, wherein the scanning means includes means for illuminating the original document.

13. The apparatus of claim 12, wherein the scanning means also includes means for moving the illuminating means from a first position corresponding to the home position of the illuminating means to a third position corresponding to the second edge of the original document via a second position corresponding to the first edge of the original document.

14. The apparatus of claim 10, wherein the command data generated by the command data generating means represents the number of the HSYNC signals.

15. The apparatus of claim 10, wherein the image forming means includes means for counting the HSYNC signals.

16. The apparatus of claim 15, wherein the forming means also includes means for transmitting VCLK signals as the image data transmission signals to the scanning means when the counting means counts down the HSYNC signals to zero.

17. The apparatus of claim 16, wherein the scanning means includes means for transmitting the image data on the VCLK signals to the image forming means when the counting means counts down the HSYNC signals to zero.

18. An image forming apparatus comprising:
means for scanning an original document, which has a first edge and a second edge opposed to the first edge, to read an image data of the original document;
means for moving the scanning means from a first position corresponding to the home position of the scanning means to a third position corresponding to the second edge of the original document via a second position corresponding to the first edge of the original document;
means for determining the moving speed of the scanning means moved by the moving means;
means for forming an image on an image boarding member corresponding to the image data read by the scanning means, the image forming means including means for generating HSYNC signals;
means for generating a command data representing a period of time required from the commencement of operation of the scanning means to the commencement of outputting the image data from the scanning means in accordance with the moving speed determined by the determining means, the command data generating means including means for calculating the number of the HSYNC signals corresponding to the command data based on the moving speed determined by the determining means and the distance between the first position corresponding to the home position of the scanning means and the first edge of the original document; and
means for performing an image forming operation of the forming means in accordance with the command data generated by the generating means.

19. The apparatus of claim 18, wherein the performing means includes means for counting the HSYNC signals.

20. The apparatus of claim 19, wherein the performing means also includes means for transmitting VCLK signals as the image data transmission signals to the scanning means when the counting means counts down the HSYNC signals to zero.

21. The apparatus of claim 20, wherein the scanning means includes means for transmitting the image data on the VCLK signals to the image forming means when the counting means counts down the HSYNC signals to zero.

22. An image forming apparatus comprising:
means for scanning an original document to read an image data of the original document;
means for moving the scanning means;
means for determining the moving speed of the scanning means moved by the moving means;
means for forming an image on an image boarding member corresponding to the image data read by the scanning means, the image forming means including means for generating HSYNC (line synchronizing) signals;
means for generating a command data representing a period of time required from the commencement of operation of the scanning means to the commencement of outputting the image data from the scanning means in accordance with the moving speed determined by the determining means, the command data generation means including means for calculating the number of the HSYNC signals corresponding to the command data based on the moving speed determined by the determining means; and
means for performing an image forming operation of the forming means in accordance with the command data generated by the generating means.

23. The apparatus of claim 22, wherein the original document has a first edge and a second edge opposed to the first edge.

24. The apparatus of claim 23, wherein the scanning means includes means for illuminating the original document.

25. The apparatus of claim 24, wherein the scanning means also includes means for moving the illuminating means from a first position corresponding to the home position of the illuminating means to a third position corresponding to the second edge of the original document via a second position corresponding to the first edge of the original document.

26. The apparatus of claim 22, wherein the command data generated by the command data generating means represents the number of the HSYNC signals.

27. An image forming apparatus comprising:
means for scanning an original document, which has a first edge and a second edge opposed to the first edge, to read an image data of the original document;
means for designating a magnification ratio of the image data read by the scanning means;
means for moving the scanning means from a first position corresponding to the home position of the scanning means to a third position corresponding to the second edge of the original document via a second position corresponding to the first edge of the original document;
means for forming an image on an image bearing member corresponding to the image data read by the scanning means, the image forming means including means for generating HSYNC signals;
means for generating a command data representing a period of time required from the commencement of operation of the scanning means to the commencement of outputting the image data from the scanning means in accordance with the magnification ratio designated by the designating means, the command data generating means including means for calculating the number of the HSYNC (line synchronization) signals corresponding to the command data based on the magnification ratio inputted by the designating means and the distance between the first position corresponding to the home position of the scanning means and the first edge of the original document; and means for controlling the commencement of the image forming operation of the forming means in accordance with the command data generated by the generating means.

* * * * *